United States Patent [19]

Steuernagel

[11] 4,252,529
[45] Feb. 24, 1981

[54] COPPER, COBALT OR CHROMIUM COMPLEX MONOAZO COMPOUNDS, PROCESSES FOR THEIR MANUFACTURE, THEIR USE AS DYESTUFFS AND FIBER MATERIALS DYED WITH THESE DYESTUFFS

[75] Inventor: Hans H. Steuernagel, Kelkheim, Fed. Rep. of Germany

[73] Assignee: Hoechst Aktiengesellschaft, Frankfurt am Main, Fed. Rep. of Germany

[21] Appl. No.: 143,190

[22] Filed: Apr. 24, 1980

Related U.S. Application Data

[63] Continuation of Ser. No. 969,197, Dec. 13, 1978, abandoned.

[30] Foreign Application Priority Data

Dec. 15, 1977 [DE] Fed. Rep. of Germany ....... 2755936

[51] Int. Cl.$^3$ ..................... C07C 107/08; C09B 45/14
[52] U.S. Cl. ......................................... 8/437; 8/536; 8/674; 8/682; 8/683; 8/685; 260/150; 260/151
[58] Field of Search .................... 260/150, 151; 8/437, 8/536, 674, 682, 683, 685

[56] References Cited

U.S. PATENT DOCUMENTS

| | | | |
|---|---|---|---|
| 3,939,141 | 2/1976 | Meininger et al. | 260/151 |
| 3,966,704 | 6/1976 | Meininger et al. | 260/150 |
| 4,000,966 | 1/1977 | Meininger et al. | 260/151 |

FOREIGN PATENT DOCUMENTS 1934123  1/1971  Fed. Rep. of Germany ........... 260/150

*Primary Examiner*—John F. Niebling
*Attorney, Agent, or Firm*—Curtis, Morris & Safford

[57] ABSTRACT

Water-soluble copper, cobalt and chromium complex monoazo compounds of which the metal-free monoazo compound contains as diazo component an aminophenol or aminonaphthol compound subtituted by a fiber-reactive radical of the vinyl sulfone series, the aminophenol possibly being substituted by a lower alkyl, lower alkoxy, nitro, sulfonic acid group, or a chlorine or bromine atom and the naphthol possibly being substituted by a sulfo group, and as coupling component a 6-sulfonaphthol(8) which may be substituted by a sulfo group in the adjacent aromatic nucleus and must be substituted by the monoamide radical of succinic acid, glutaric acid or adipic acid.

They are prepared by diazotization of the corresponding aniline and naphthylamine compounds containing, in o-position to the amino group, a hydrogen atom, a hydroxy group or a lower alkoxy group, with subsequent coupling with the above coupling component and transformation into the metal complex compounds by an agent donating copper, cobalt or chromium, optionally in the presence of an oxidant. The coupling components can be prepared by reacting the corresponding aminonaphthol mono- or disulfonic acids with a dihalide or anhydride of succinic acid, glutaric acid or adipic acid.

The metal complex compounds have outstanding dyestuff properties. They have a good solubility in water and are especially suitable for dyeing fiber materials of natural and regenerated cellulose, of natural, regenerated or synthetic polyamides of polyurethanes as well as leather. The dyeings display very good fastness to light and to wet processing, a high color strength and portions of the dyestuff which have not been fixed on the fiber can be washed off easily.

6 Claims, No Drawings

COPPER, COBALT OR CHROMIUM COMPLEX MONOAZO COMPOUNDS, PROCESSES FOR THEIR MANUFACTURE, THEIR USE AS DYESTUFFS AND FIBER MATERIALS DYED WITH THESE DYESTUFFS

This is a continuation of application Ser. No. 969,197, filed Dec. 13, 1978, now abandoned.

Metal-free, fiber-reactive monoazo dyestuffs which contain a carboxyalkylcarboxamide group are known from Japanese Patent Publications Nos. Sho-46-28,903, Sho-46-28,906, Sho-46-42,350 and Sho-46-42,351 and also from German Auslegeschrift No. 1,934,123. However, the dyestuffs have the disadvantage that their dyeings on cellulose fiber materials frequently do not meet the demands often made today in respect of the fastness to light and the fastness to "chlorine bleach" (the term "chlorine bleach" means here and subsequently especially the fastness to bleaching with hypochlorite and to chlorinated water).

With the present invention, novel, valuable compounds which are suitable as dyestuffs have now been found which, surprisingly, display markedly improved fastness characteristics towards the action of light and of chlorine-containing bleaching agents. These novel compounds are copper, cobalt and chromium complex compounds of monoazo compounds which, described in the form of the free acid, have the general formula (1)

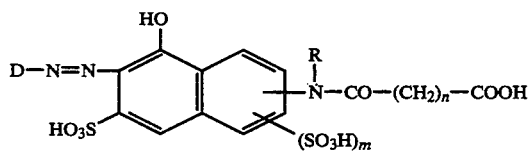
(1)

and their salts. In the formula (1) the radicals in the formula have the following meaning: R is a hydrogen atom or a lower alkyl group, such as a methyl or ethyl group, m represents the number 0 or 1, n represents the number 2, 3 or 4 and D is a radical which, described in the form of the free acid, has the general formula (2), (3) or (4)

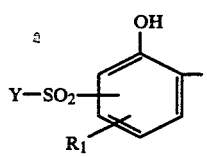
(2)

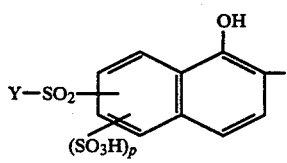
(3)

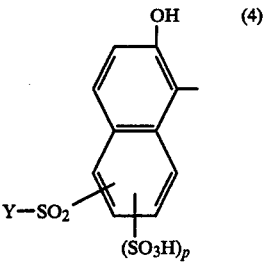
(4)

in which $R_1$ represents a hydrogen atom, a lower alkyl group, such as a methyl group, a lower alkoxy group, such as a methoxy group, a nitro or sulfonic acid group or a chlorine or bromine atom, Y represents a β-thiosulfatoethyl or β-chloroethyl radical and especially a vinyl or β-sulfatoethyl radical and p denotes the number 0 or 1.

The novel, metal complex compounds of the monoazo compounds of the formula (1) are preferably in the form of their alkali metal and alkaline earth metal salts, such as sodium, potassium or calcium salts; the alkali metal salts are particularly preferred and the novel metal complex compounds are also preferably used in the form of the alkali metal salts.

The novel metal complex compounds are manufactured in the manner according to the invention by diazotizing an amino compound of the general formula (5)

$$D_1-NH_2 \qquad (5)$$

in which $D_1$ denotes a radical which, described in the form of the free acid, has the formula (6), (7) or (8)

(6)

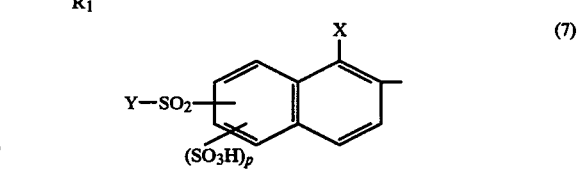
(7)

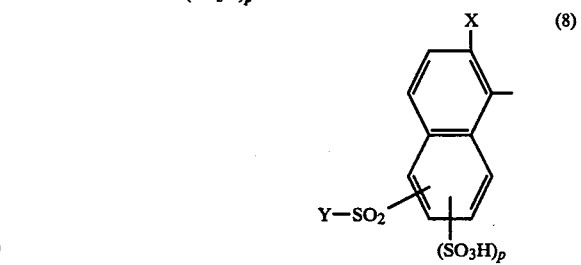
(8)

in which $R_1$, Y and p are as defined above and X represents a hydroxy group or a lower alkoxy group, such as a methoxy group, or a hydrogen atom, and reacting the diazo compound with a coupling component which, described in the form of the free acid, has the general formula (9)

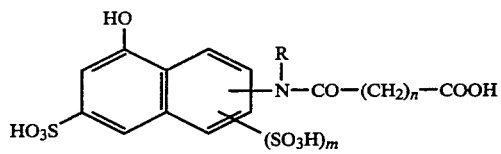

(9)

in which R, m and n are as defined above, and treating the resulting monoazo compound which, described in the form of the free acid, has the general formula (10)

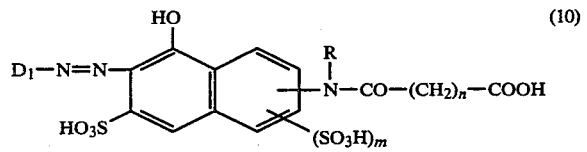

(10)

in which $D_1$, R, m and n are as defined above, with a copper donor, cobalt donor or chromium donor, if appropriate in the presence of an oxidizing agent.

The coupling components of the formula (9) which are used to manufacture the compounds of the formula (1) can be obtained, for example, by acylating an aminonaphtholsulfonic acid which, described in the form of the free acid, has the general formula (11)

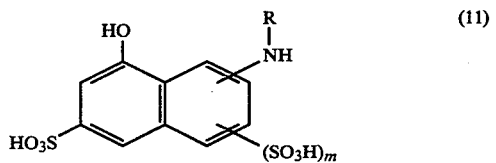

(11)

in which R and m are as defined above, with a dicarboxylic acid anhydride of the formula (12) or with a dicarboxylic acid dihalide of the formula (13)

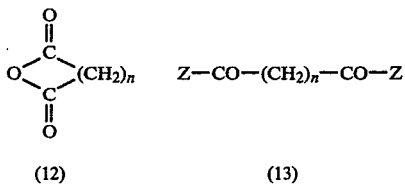

(12)        (13)

in which n is as defined above and Z denotes a chlorine or bromine atom, in the presence of an acid-binding agent. The dicarboxylic acid anhydrides of the formula (12) and dicarboxylic acid dihalides of the formula (13) are succinic anhydride, glutaric anhydride, adipic anhydride, succinic acid dichloride, succinic acid dibromide, glutaric acid dichloride, glutaric acid dibromide, adipic acid dichloride and adipic acid dibromide. The acid-binding agents used are preferably alkali metal hydroxides or alkaline earth metal hydroxides or alkali metal or alkaline earth metal salts of weak inorganic or organic acids, but advantageously alkali metal carbonates or bicarbonates or alkaline earth metal carbonates or bicarbonates, such as sodium carbonate, potassium carbonate, sodium bicarbonate or calcium carbonate; the acid formed during the reaction is bonded by these compounds and neutralized. The reaction of the aminonaphtholsulfonic acids of the formula (11) with the anhydrides of the formula (12) or halides of the formula (13) can be carried out in an organic or aqueous-organic medium and is preferably carried out in water as the solvent, at a temperature between $-5°$ C. and $+60°$ C. and preferably at a temperature between $0°$ C. and $30°$ C., at a pH value between about 2 and 9.

Examples of aminonaphtholsulfonic acids of the formula (11), which are used as starting components, are: 1-amino-8-hydroxynaphthalene-3,6- or -4,6-disulfonic acid, 1-amino-5-hydroxynaphthalene-7-sulfonic acid, 1-amino-5-hydroxynaphthalene-3,7-disulfonic acid, 2-amino-5-hydroxynaphthalene-7-sulfonic acid, 2-amino-8-hydroxynaphthalene-6-sulfonic acid and 2-amino-8-hydroxynaphthalene-3,6-disulfonic acid and also their N-monoalkyl derivatives containing an alkyl group with 1 to 4 C atoms, such as, for example, 2-(N-methylamino)-8-hydroxynaphthalene-6-sulfonic acid, 2-(N-methylamino)-5-hydroxynaphthalene-7-sulfonic acid, 1-(N-methylamino)-8-hydroxynaphthalene-3,6-disulfonic acid and 1-(N-ethylamino)-8-hydroxynaphthalene-3,6-disulfonic acid.

Examples of amines of the general formula (5) used as diazo components in the process according to the invention are: 3- or 4-(β-sulfatoethylsulfonyl)-aniline, 2-amino-4- or -5-(β-sulfatoethylsulfonyl)-anisole, 2-methoxy-5-methyl-4-(β-sulfatoethylsulfonyl)-aniline, 2,5-dimethoxy-4-(β-sulfatoethylsulfonyl)-aniline, 2,4-dimethoxy-5-(β-sulfatoethylsulfonyl)-aniline, 4-amino-3-(β-sulfatoethylsulfonyl)-anisole, 4-amino-3-(β-sulfatoethylsulfonyl)-toluene, 4-(β-sulfatoethylsulfonyl)-aniline-2-sulfonic acid, 2-chloro- or 2-bromo-4-(β-sulfatoethylsulfonyl)-aniline, 2-amino-4- or -5-(β-sulfatoethylsulfonyl)-phenol, 6-chloro-, 6-bromo- or 6-nitro-4-(β-sulfatoethylsulfonyl)-phenol, 2-amino-4-(β-sulfatoethylsulfonyl)-phenol-6-sulfonic acid, 2-amino-4-methyl- or -4-methoxy-5-(β-sulfatoethylsulfonyl)-phenol, 2-amino-5-(β-sulfatoethylsulfonyl)-naphthalene, 2-amino-6-(β-sulfatoethylsulfonyl)-naphthalene, 2-amino-8-(β-sulfatoethylsulfonyl)-naphthalene, 2-amino-8-(β-sulfatoethylsulfonyl)-naphthalene-6-sulfonic acid, 1-amino-5- or -6- or -7-(β-sulfatoethylsulfonyl)-naphthalene and their corresponding vinylsulfonyl, β-thiosulfatoethyl-sulfonyl and β-chloroethylsulfonyl compounds.

The amino compounds of the general formula (5) can be converted to their diazonium compounds in a known manner, by direct or indirect diazotization. The reaction of these diazonium compounds with the coupling components of the general formula (9) to give monoazo dyestuffs of the general formula (10) is preferably carried out in an aqueous medium at temperatures between $0°$ C. and $50°$ C. and at a pH value of 2 to 9.

Examples of organic solvents which can be used, on their own or as a mixture or emulsion with water, as the medium for the abovementioned acylation of the aminonaphtholsulfonic acid of the formula (11) are: aromatic hydrocarbons, such as benzene or toluene, chlorinated aromatic or aliphatic hydrocarbons, such as chlorobenzene, o-dichlorobenzene, methylene chloride or ethylene chloride, dialkyl ketones, such as acetone or methyl ethyl ketone, dialkyl ethers, such as diethyl ether, or N-alkylpyrrolidones, such as N-methylpyrrolidone.

The reaction of the monoazo compounds of the general formula (10) in the process according to the invention with the copper donors, cobalt donors or chromium donors is carried out analogously to the known processes for metallization. Preferably, the monoazo compounds of the formula (10) are treated in an aqueous medium at a temperature between $0°$ and $130°$ C., if appropriate with reflux cooling or in a closed vessel under pressure, with the metal donors; if the metallization is carried out as oxidative coppering, that is to say the radical X in the formula represents a hydrogen atom in the compounds of the formula (10), a conventional oxidizing agent is added.

The metal donors used in the metallization process according to the invention are, for example, salts of copper, of cobalt and of chromium which are able to donate the said metal in the form of a cation to the hydroxy groups, capable of forming a complex, in the compounds of the formula (1) which may have formed in the oxidative or dealkylating metallization, for example, copper sulfate, copper acetate, copper carbonate, cobalt sulfate, cobalt acetate and chromium sulfate; such compounds which are suitable as metallizing agents are also organic hydroxycarboxylic acids or dicarboxylic acids which contain the metal bonded as a complex, thus, for example, complex chromium or cobalt compounds of aliphatic hydroxycarboxylic acids or aliphatic dicarboxylic acids, especially of alkanes of 2 to 6 C atoms, or chromium complex compounds of aromatic o-hydroxycarboxylic acids, thus, for example, the chromium or cobalt complex compounds of salicylic acid, citric acid, lactic acid, glycollic acid or tartaric acid.

The novel copper, cobalt or chromium complex compounds of the monoazo compounds of formula (1) can be isolated from the solutions in which they have been manufactured, in the form of the alkali metal or alkaline earth metal salts by conventional methods, for example by salting out with sodium chloride, potassium chloride or calcium chloride or by evaporating or spray-drying the dyestuff solution. They are obtained as electrolyte-containing powders in this way.

The novel copper, cobalt and chromium complex compounds, according to the invention, of the compounds of the formula (1) are distinguished by a very good solubility in water. They are suitable for use as dyestuffs, especially for dyeing and printing fiber materials of natural or regenerated cellulose, such as cotton, linen, hemp, jute or filament viscose, or fiber materials of natural, regenerated or synthetic polyamides, such as silk, wool, polyamide 6, polyamide 66 or polyamide 11, and also fiber materials of synthetic polyurethanes or leather. In particular, the metal complex compounds according to the invention are suitable as fiber-reactive dyestuffs for dyeing cellulose or cellulose-containing fiber materials.

The fiber materials of the abovementioned origin which have been dyed with the novel dyestuffs according to the invention and are thus according to the invention display a very good fastness to light and good to very good wet fastness properties, such as, for example, fastness to washing, fastness to chlorine bleach, fastness to milling, fastness to cross-dyeing, fastness to water, fastness to seawater and fastness to perspiration; on dyeing (including printing) these fiber materials, the metal complex compounds according to the invention exhibit a high color strength and are distinguished in particular by the fact that portions of dyestuff which have not been fixed on the fiber can be washed off easily.

The present invention thus also relates to the use of the novel metal complex compounds according to the invention for dyeing and printing the abovementioned fiber materials or leather and to a process for dyeing or printing these fiber materials or leather, which is analogous to known dyeing and printing processes customary in industry and in which a copper, cobalt or chromium complex compound of a monoazo compound of the formula (1) is applied in the form of a solution to the fiber material or leather and is then fixed on the material analogously to processes which are known and customary in industry, especially processes which are known and customary for fixing fiber-reactive dyestuffs. The coloring of the materials containing carboxamide groups as a rule takes place in the neutral to weakly acid pH range by the dyeing and printing processes customary in industry for natural and synthetic polyamide fiber materials and leather; on the other hand, the metal complex compounds according to the invention are as a rule fixed on the cellulose fiber materials with the aid of agents having an alkaline action, for example using alkali metal hydroxides, alkali metal carbonates, alkali metal bicarbonates, alkali metal phosphates or alkali metal silicates, the sodium or potassium salts and hydroxides preferably being employed as the alkali. The use of these procedures corresponds to the printing and dyeing methods which are known and customary in industry for fiber-reactive dyestuffs.

Amongst the novel metal complex compounds of the present invention, the copper complex compounds of the monoazo compounds of the formula (1) are preferred in particular.

Preferred individual compounds which may be mentioned amongst these are, in particular, the compounds which, described in the form of the free acid, have the formulae (1a), (1b), (1c), (1d) and (1e)

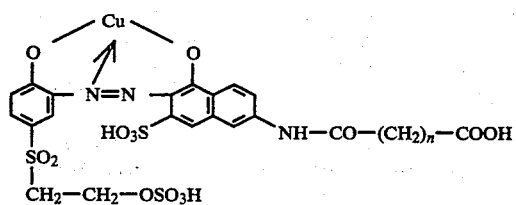

(1a)

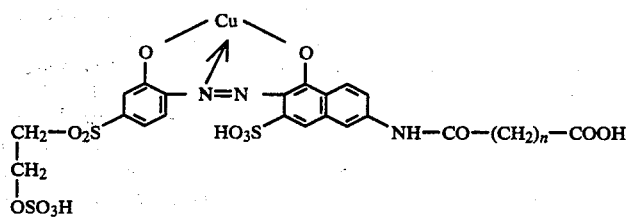

(1b)

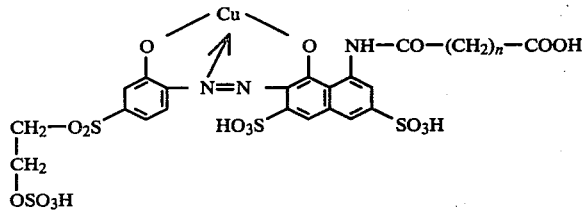

(1c)

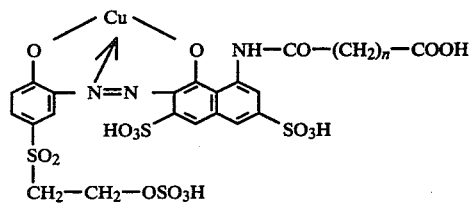

(1d)

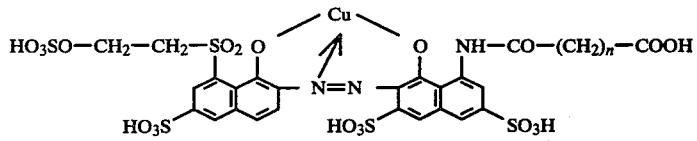

(1e)

in which n represents the number 2 or 3 in each case.

In the examples which follow, the relationship between parts by volume and parts by weight is the same as that between liter and kilogram.

EXAMPLE 1

(a) 23.9 parts by weight of 2-amino-5-hydroxynaphthalene-7-sulfonic acid are dissolved in 170 parts of water, with the addition of sodium carbonate, at pH 6–7. 17.2 parts by weight of glutaric anhydride are then added and the mixture is stirred for one hour at room temperature, the pH value being kept between 5 and 6 by sprinkling in sodium carbonate. No further starting compound should be present in the reaction solution at the end of this time.

(b) 200 parts by weight of ice and 35 parts by weight of 31% strength hydrochloric acid are added to a neutral aqueous solution which contains 29.7 parts by weight of 2-amino-4-(β-sulfatoethylsulfonyl)-phenol per 500 parts by volume, and the mixture is then diazotized with an aqueous solution of 7.0 parts by weight of sodium nitrite. A small amount of excess nitrite is destroyed after 15 minutes by adding a little amidosulfonic acid.

The resulting diazonium salt solution is added to the solution obtained according to (a) and the pH value is then adjusted to 6–7 by sprinkling in sodium carbonate. After the coupling reaction has ended, 25 parts by weight of copper sulfate pentahydrate are added and the pH is adjusted to 4.5–5.0 by sprinkling in sodium acetate. The coupling reaction has ended when no further non-coppered dyestuff can be discerned in the chromatogram. 10 parts by weight of kieselguhr are then added and the dyestuff solution is filtered. The resulting copper complex dyestuff which, in the form of its free acid, corresponds to the formula

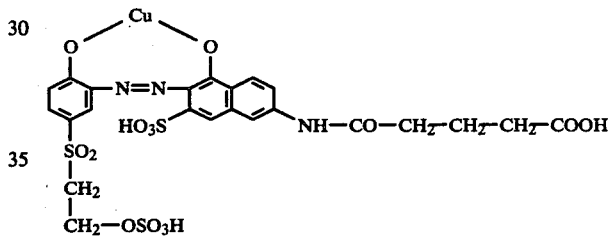

is isolated in the form of the trisodium salt by evaporating the dyestuff solution, the pH of which has been adjusted to 5.0–5.5, in a rotary evaporator in vacuo or by spray-drying this solution.

A dark brown powder is obtained. On cotton, in the presence of agents having an alkaline action, the dyestuff gives intense, bluish-tinged red dyeings and prints which have very good fastness to light and very good wet fastness properties.

EXAMPLE 2

21 g of the dyestuff which has the formula indicated under Example 1(b) and has been prepared according to Example 1 are dissolved, in the form of the trisodium salt, together with 50 g of urea in 300 g of water. The solution is stirred into 400 g of 4% strength alginate thickener at below 40° C. After adding 10 g of sodium bicarbonate, the total amount is increased to 1,000 g by adding further 4% strength alginate thickener and the print paste is stirred well. Cotton fabric is printed with this print paste and the prints are dried at 60° C. They are then treated for 5 minutes in a Mather-Platt steamer with saturated steam at 100°–103° C. They are then rinsed with cold and hot water and then treated with water at 80°–90° C. to which a neutral detergent has been added. The prints are then rinsed again with cold water and then dried. Intense, dark bluish-tinged red prints with very good fastness to light and very good wet fastness properties are obtained.

EXAMPLE 3

Mercerized cotton fabric is padded at 20° C., with an 80% liquor pick-up, with a liquor which contains, per liter, 20 g of the dyestuff of the formula indicated under Example 1(b)—prepared according to Example 1—and 18 g of an aqueous 33% strength sodium hydroxide solution. The fabric is then wound on a beam and wrapped in a film and left to stand for 8 hours at room temperature. The goods are then rinsed with cold water, neutralized with acetic acid, rinsed with cold, hot and boiling water and finally dried. This gives an intense, bluish-tinged red dyeing with very good fastness to light and very good wet fastness properties.

EXAMPLE 4

100 parts by weight of mercerized cotton fabric are dyed for 10 minutes at 60° C. in 3,000 parts by volume of a liquor which contains 5 parts by weight of the dyestuff of the formula indicated under Example 1(b)—prepared according to Example 1—and 150 parts by weight of anhydrous sodium sulfate. 15 parts by weight of anhydrous sodium carbonate and 4 parts by weight of 33% strength sodium hydroxide solution are then added. Dyeing is continued for a further 60 minutes at 60° C. The cotton fabric is then neutralized with acetic acid and then rinsed with cold, hot and boiling water, in fresh baths in each case, and finally is dried. This gives an intense, bluish-tinged red dyeing with very good fastness to light and very good wet fastness properties.

EXAMPLE 5

100 parts by weight of wool fabric are introduced into a dyebath which is at 40° C. and contains 2 parts by weight of the dyestuff of the formula indicated under Example 1(b)—prepared according to Example 1—and also 0.15 part by weight of the adduct of 12 moles of ethylene oxide with 1 mole of stearylamine, 2 parts by weight of ammonium acetate and 2 parts by weight of 60% strength acetic acid in 3,000 parts of water. The temperature of the dyebath is raised to the boil in the course of 30 minutes and dyeing is then carried out for 60 minutes at 100° C. After the customary washing out and finishing, an intense, bluish-tinged red dyeing with very good fastness to light and very good wet fastness properties is obtained.

If the wool fabric is replaced by 100 parts by weight of polycaprolactam fabric, an intense, bluish-tinged red dyeing with very good fastness properties in use is again obtained.

The dyestuffs described below can also be used in accordance with the printing or dyeing methods described in Examples 2 to 5, on the said textile substrates. The prints and dyeings thus obtained are distinguished by high color strength, good to very good fastness to light and good to very good wet fastness properties.

EXAMPLE 6

If, in Example 1 under (b), the 25 parts by weight of copper sulfate pentahydrate are replaced by 14.1 parts by weight of cobalt sulfate heptahydrate and, during the metallization, the pH value is adjusted to 5–5.5 and the temperature is adjusted to 50°–60° C., but in other respects the procedure is as described under Example 1, the 1:2 cobalt complex compound of the dyestuff which, in the form of its free acid, has the formula

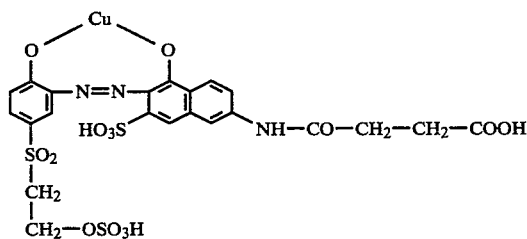

is formed. The neutral dyestuff is isolated by spray-drying the resulting dyestuff solution at pH 5.0–5.5. A dark brown powder is obtained. On cotton, in the presense of agents having an alkaline action, the dyestuff gives brown dyeings and prints with good fastness to light and good wet fastness properties.

EXAMPLE 7

If, in Example 1 under (b), the 25 parts by weight of copper sulfate pentahydrate are replaced by the same amount of chromium-potassium sulfate and during the metallization the reaction mixture is heated under reflux at 95°–100° C., at pH 5–6, for several hours, the 1:2 chromium complex compound of the dyestuff which, in the form of its free acid, has the formula given under Example 6, is formed.

The neutral dyestuff is isolated by spray-drying or by evaporating the dyestuff solution, the pH of which has been adjusted to 5–5.5. A dark brown powder is obtained. On cotton, in the presence of agents having an alkaline action, the dyestuff gives intense, brown-violet dyeings and prints with good fastness to light and good wet fastness properties.

EXAMPLE 8

If, in Example 1 under (a), the 17.2 parts by weight of glutaric anhydride are replaced by 15.1 parts by weight of succinic anhydride and in other respects the procedure is exactly as described under Example 1, a brown dyestuff powder is again obtained; this powder contains the dyestuff which, in the form of its free acid, has the formula $$\text{(structure as shown with Cu complex, N=N, HO}_3\text{S, SO}_2\text{CH}_2\text{CH}_2\text{—OSO}_3\text{H, NH—CO—CH}_2\text{—CH}_2\text{—COOH)}$$

in the form of the neutral trisodium salt. Isolation of the dyestuff can be effected not only by evaporating or spray-drying the resulting dyestuff solution but also by salting out with sodium chloride and subsequently filtering off the dyestuff which has precipitated and drying this. On cotton, in the presence of agents having an alkaline action, the dyestuff gives intense, bluish-tinged red dyeings and prints with very good fastness to light and good to very good wet fastness properties.

EXAMPLE 9

If, in Example 1 under (a), the 17.2 parts by weight of glutaric anhydride are replaced by 19.4 parts by weight of adipic anhydride and in other respects the procedure is exactly as described under Example 1, a brown dyestuff powder is obtained which contains the dyestuff which, in the form of its free acid, has the formula

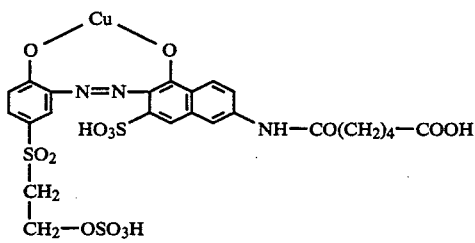

in the form of the neutral trisodium salt. On cotton, in the presence of agents having an alkaline action, the dyestuff gives intense bluish-tinged red dyeings and prints with very good fastness to light and very good wet fastness properties.

EXAMPLE 10

(a) 25 parts by weight of adipic acid dichloride are allowed to run into 70 parts by weight of N-methylpyrrolidone. 16 parts by weight of 1-amino-8-hydroxynaphthalene-3,6-disulfonic acid, in the form of the dry, powdered monosodium salt, are then introduced in the course of one hour. After stirring for 24 hours, virtually no further free amino groups are present. The reaction mixture is diluted with 300 parts of water and the pH is then adjusted to 5-6 by sprinkling in sodium carbonate. The resulting neutral solution contains the compound which has been acylated on the amino group and which, in the form of its free acid, has the formula

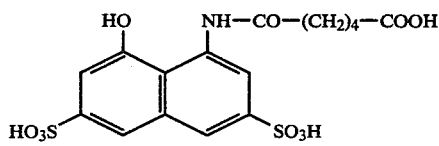

in the form of the trisodium salt.

(b) 100 parts by weight of ice and 18 parts by weight of 31% strength hydrochloric acid are added to an aqueous neutral solution which contains 14.85 parts by weight of 2-amino-5-(β-sulfatoethylsulfonyl)-phenol per 250 parts by volume and the mixture is then diazotized with an aqueous solution of 3.5 parts by weight of sodium nitrite. After 15 minutes, a small amount of excess nitrite is destroyed by adding amidosulfonic acid. The resulting diazonium salt solution is added to the solution obtained according to (a) and the pH value is then adjusted to 6-7 by sprinkling in sodium carbonate. After the coupling reaction has ended, 12.5 parts by weight of copper sulfate pentahydrate are added and the pH value is adjusted to 4.5-5.0 by sprinkling in sodium acetate. When no further non-coppered dyestuff can be detected in the chromatogram, 5 parts by weight of kieselguhr are added to the dyestuff solution and the solution is filtered. The resulting copper complex dyestuff which, in the form of its free acid, has the formula

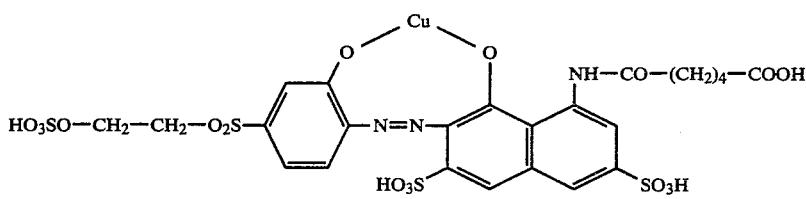

is isolated as the tetrasodium salt by evaporating, in vacuo, or spray-drying the dyestuff solution, the pH of which has been adjusted to 5-5.5. A dark brown-violet powder is obtained. On cotton, in the presence of agents having an alkaline action, the dyestuff gives intense violet dyeings and prints with very good fastness to light and good to very good wet fastness properties.

EXAMPLE 11

28.1 parts by weight of 1-amino-4-(β-sulfatoethylsulfonyl)-benzene are diazotized in 100 parts of water, 100 parts by weight of ice and 35 parts by weight of 31% strength hydrochloric acid at 0°-10° C. with an aqueous solution of 7.0 parts by weight of sodium nitrite. After 15 minutes a small amount of excess nitrite is destroyed by adding amidosulfonic acid. The resulting diazonium salt suspension is added to the solution obtained according to Example 1 (a) and the pH value is kept between 4 and 5 by sprinkling in sodium carbonate. After the coupling reaction has ended, 40 parts by weight of copper sulfate pentahydrate and also 40 parts by weight of crystalline sodium acetate are added to the reaction mixture and the pH is adjusted to 5.0-5.2 with sodium carbonate. 27 parts by weight of 30% strength hydrogen peroxide solution are then allowed to run in dropwise at 20°-30° C. and pH 5.0-5.2 in the course of 3 hours. The mixture is stirred for a further 2 hours and a check is made, by means of a chromatogram, to determine whether coppering is complete. If the mixture still contains non-coppered dyestuff, correspondingly more hydrogen peroxide solution must be added in addition.

After coppering is complete, the mixture is clarified by adding kieselguhr. The resulting copper complex dyestuff which, in the form of its free acid, has the formula

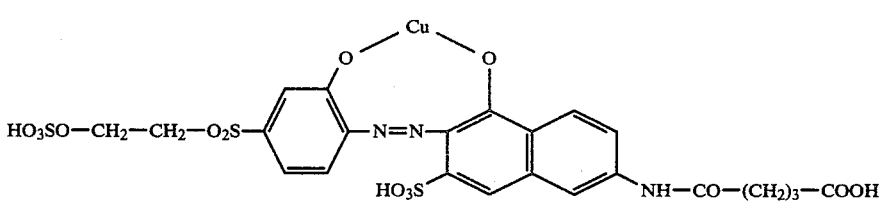

is precipitated from the clarified dyestuff solution by sprinkling in potassium chloride; the precipitate is filtered off, washed with dilute aqueous potassium chloride solution and dried. On cotton, in the presence of agents having an alkaline action, the resulting dyestuff gives deep red-violet dyeings and prints with very good fastness to light and very good wet fastness properties.

EXAMPLE 12

If, in Example 11, the 28.1 parts by weight of 1-amino-4-(β-sulfatoethylsulfonyl)-benzene are replaced by 29.7 parts by weight of 1-amino-4-(β-thiosulfatoethylsulfonyl)-benzene and in other respects the procedure is exactly as described under Example 11, a dyestuff is obtained which, in the form of its free acid, has the formula

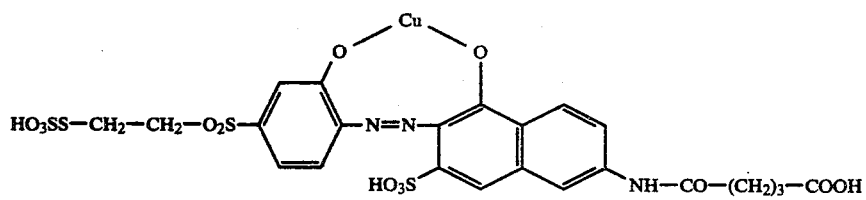

and which, on cotton, likewise gives intense, red-violet dyeings and prints with very good fastness to light and very good wet fastness properties.

EXAMPLE 13

(a) 31.9 parts by weight of 1-amino-8-hydroxynaphthalene-3,6-disulfonic acid are dissolved in 100 parts of water with the addition of sodium carbonate, at pH 6-7. 13.7 parts by weight of glutaric anhydride are then sprinkled in, with good stirring. The mixture is stirred at room temperature for one hour and during this time the pH value is kept between 5 and 6 by adding sodium carbonate. At the end of this time, no further free amino groups should be detectable in the solution obtained.

(b) 18.3 parts by weight of 1-amino-4-vinylsulfonyl-benzene are diazotized in 100 parts of water, 100 parts by weight of ice and 30 parts by weight of 31% strength hydrochloric acid at 0°-5° C. with an aqueous solution of 7.0 parts by weight of sodium nitrite. After 30 minutes, a small amount of excess nitrite is destroyed by adding amidosulfonic acid. The diazotization mixture is allowed to run into the solution prepared according to (a) and the pH value is kept between 5.5 and 6.5 by sprinkling in sodium carbonate. After the coupling reaction has ended, 40 parts by weight of copper sulfate pentahydrate and 40 parts by weight of crystalline sodium acetate are added to the reaction mixture and the pH is adjusted to 5.0-5.2 with sodium carbonate. 27 parts by weight of 30% strength hydrogen peroxide solution are now allowed to run in dropwise in the course of 3 hours, at 20°-30° C. and pH 5.0-5.2. The reaction mixture is stirred for a further 2 hours and a check is made, by means of a chromatogram, to determine whether the non-coppered dyestuff has disappeared. If a residue should still be present, correspondingly more hydrogen peroxide solution must be added in addition. After coppering is complete, 10 parts by weight of kieselguhr are added to the dyestuff solution, 8 parts by weight of oxalic acid dihydrate are then introduced, with stirring, and the pH is adjusted to 6 by sprinkling in sodium carbonate. The mixture is heated to 60°-65° C. and filtered. The pH of the filtrate is adjusted to 5.0-5.5 with hydrochloric acid and the filtrate is then evaporated to dryness in a vacuum cabinet or a circulating air cabinet at 60° C. On cotton, in the presence of agents having an alkaline action, the resulting dyestuff, which, in the form of its free acid, has the formula

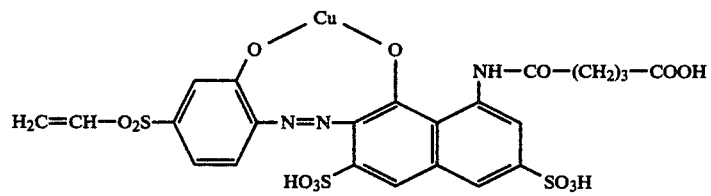

gives intense violet dyeings and prints with very good fastness to light and very good wet fastness properties.

EXAMPLE 14

If, in Example 13, the 18.3 parts by weight of 1-amino-4-vinylsulfonyl-benzene are replaced by 22.0 parts by weight of 1-amino-4-(β-chloroethylsulfonyl)-benzene and in other respects the procedure is as described under Example 13, a dyestuff is obtained which, in the form of its free acid, has the formula

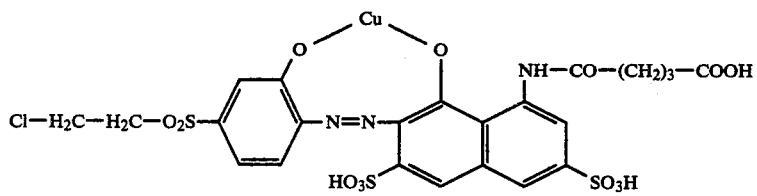

and which, on cotton, in the presence of agents having an alkaline action, gives intense violet dyeings and prints with very good fastness to light and very good wet fastness properties.

EXAMPLE 15

41.1 parts by weight of 2-amino-8-(β-sulfatoethylsulfonyl)-naphthalene-6-sulfonic acid are dissolved in 150 parts of water at pH 6–7, sodium carbonate being sprinkled in, and then, after adding 100 parts by weight of ice and 35 parts by weight of 31% strength hydrochloric acid, diazotized at 0°–10° C. by dropwise addition of an aqueous solution of 7.0 parts by weight of sodium nitrite. 15 minutes later, a small amount of excess nitrite is destroyed by adding amidosulfonic acid. The diazotization mixture is now added to a solution prepared according to Example 13 (a). The pH value is kept between 5.5 and 6.5 by sprinkling in sodium carbonate. After the coupling reaction has ended, 30 parts by weight of copper sulfate pentahydrate and 30 parts by weight of crystalline sodium acetate are added. 40 parts by weight of 35% strength hydrogen peroxide solution are then allowed to run in dropwise in the course of 3 hours, at 40°–50° C., and during the addition the pH value is kept at between 4.7 and 5.2 by sprinkling in sodium carbonate. After coppering is complete (as can be seen from the chromatogram), 10 parts by weight of kieselguhr are added and the solution is filtered. The resulting copper complex dyestuff which, in the form of its free acid, has the formula

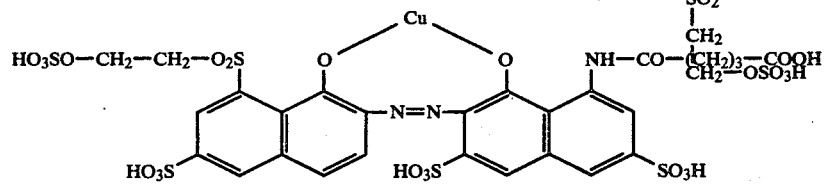

is precipitated by sprinkling potassium chloride into the filtrate. The dyestuff precipitate is filtered off, washed with dilute aqueous potassium chloride solution and dried in a circulating air cabinet at 60° C. On cotton, in the presence of agents having an alkaline action, the dyestuff gives deep-colored blue dyeings and prints with very good fastness to light and good to very good wet fastness properties.

EXAMPLE 16

34.1 parts by weight of 2,5-dimethoxy-4-(β-sulfatoethylsulfonyl)-aniline are diazotized in 150 parts of water, 150 parts by weight of ice and 35 parts by weight of 31% strength hydrochloric acid with an aqueous solution of 7.0 parts by weight of sodium nitrite. After 15 minutes, a small amount of excess nitrite is destroyed by adding amidosulfonic acid. The diazotization mixture is then allowed to run into a solution prepared according to Example 13 (a) and the pH value is kept between 5 and 6 by sprinkling in sodium carbonate. After the coupling reaction has ended, 40 parts by weight of copper sulfate pentahydrate and then 40 parts by weight of crystalline sodium acetate are introduced. The mixture is then allowed to boil under reflux at pH 4.0 to 4.5 until no further non-coppered dyestuff can be seen in the chromatogram. The dyestuff solution is then clarified by adding kieselguhr. The resulting dyestuff which, in the form of its free acid, has the formula

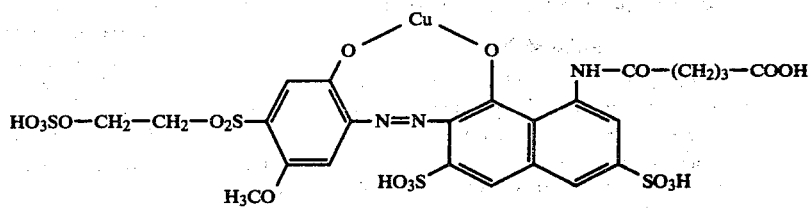

is precipitated by sprinkling sodium chloride into the filtrate. The dyestuff precipitate is filtered off, washed with dilute aqueous sodium chloride solution and dried. On cotton, in the presence of agents having an alkaline action, the dyestuff gives intense, reddish-tinged blue dyeings and prints with very good fastness to light and very good wet fastness properties.

EXAMPLE 17

If, in Example 11, the 1-amino-4-(β-sulfatoethylsulfonyl)-benzene is replaced by the same amount of 1-amino-3-(β-sulfatoethylsulfonyl)-benzene and in other respects the procedure is as described under Example 11, the dyestuff which, in the form of its free acid, has the formula

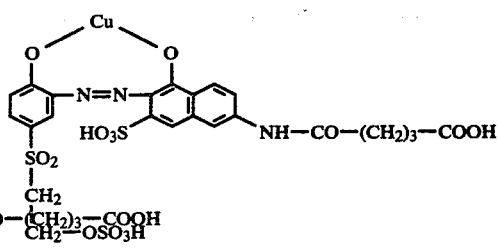

is obtained. The dyestuff can be salted out with potassium chloride and filtered off. However, the dyestuff can also be isolated by evaporating or spray-drying the dyestuff solution, if the excess copper not bonded as a complex has previously been precipitated as copper oxalate, at pH 5–6, by sprinkling in 5.5 parts by weight of oxalic acid and the oxalate has been filtered off. On cellulose textile material, in the presence of agents having an alkaline action, the resulting dyestuff gives deep, bluish-tinged red dyeings and prints with very good properties in respect of the fastness to light and fastness to washing.

The table which follows describes further metal complex compounds of monoazo dyestuffs, which can be prepared analogously to the processes described in Examples 1 and 6 to 17. The radical of the diazo component is given in column I, the radical of the coupling component is given in column II, the complex-forming metal is given in column III and the color shade of the dyeing produced on cotton by the monoazo metal complex dyestuff is given in column IV.

TABLE

| Example | I Radical of the diazo component | II Radical of the coupling component | III Complex-forming metal | IV Color shade on cotton |
|---|---|---|---|---|
| 18 | ![structure: 2-methylphenol with OH and $Y_1$] | ![structure: naphthol with OH, $HO_3S$, CH$_3$, NH—CO(CH$_2$)$_2$—COOH] | cobalt | brown |
| 19 | " | " | chromium | violet |
| 20 | ![structure: $Y_1$-phenol with OH and CH$_3$] | " | copper | claret |
| 21 | " | " | cobalt | violet-brown |
| 22 | " | " | chromium | reddish-tinged navy-blue |
| 23 | ![structure: $Y_1$-phenol with OH and CH$_3$] | " | copper | red-violet |
| 24 | " | " | cobalt | violet |
| 25 | " | " | chromium | navy-blue |
| 26 | ![structure: $Y_1$-phenol with OH, CH$_3$, OCH$_3$] | " | copper | violet |
| 27 | " | " | cobalt | navy-blue |
| 28 | " | " | chromium | navy-blue |
| 29 | ![structure: phenol with OH, CH$_3$, H$_3$C, $Y_1$] | " | copper | bluish-tinged red |
| 30 | ![structure: phenol with OH, CH$_3$, H$_3$CO, $Y_1$] | " | copper | red-violet |
| 31 | ![structure: $Y_1$-phenol with OH, CH$_3$, SO$_3$H] | ![structure: naphthol with OH, CH$_3$, HO$_3$S, NH—CO—(CH$_2$)$_2$—COOH] | copper | red-violet |
| 32 | ![structure: $Y_1$-phenol with OH, CH$_3$, Cl] | " | copper | red-violet |
| 33 | ![structure: $Y_1$-phenol with OH, CH$_3$, Br] | " | copper | red-violet |
| 34 | ![structure: phenol with OH, HO$_3$S, CH$_3$, $Y_1$] | " | copper | bluish-tinged red |
| 35 | " | " | cobalt | brown |
| 36 | " | " | chromium | violet |

TABLE-continued

| Example | I Radical of the diazo component | II Radical of the coupling component | III Complex-forming metal | IV Color shade on cotton |
|---|---|---|---|---|
| 37 | 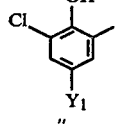 | " | copper | bluish-tinged red |
| 38 | " | " | cobalt | brown |
| 39 | " | " | chromium | violet |
| 40 | 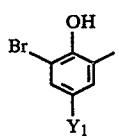 | " | copper | bluish-tinged red |
| 41 | 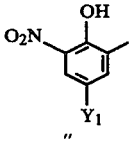 | " | copper | red-violet |
| 42 | " | " | cobalt | brown-violet |
| 43 | " | " | chromium | navy-blue |
| 44 | 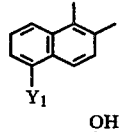 | " | copper | violet |
| 45 | 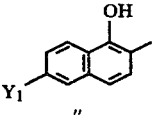 | " | copper | violet |
| 46 | " | " | cobalt | navy-blue |
| 47 | " | " | chromium | navy-blue |
| 48 | 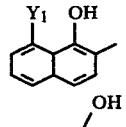 | " | copper | violet |
| 49 | 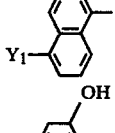 | " | copper | violet |
| 50 | 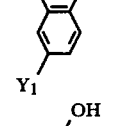 | " | copper | violet |
| 51 | 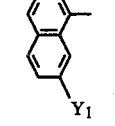 | " | copper | violet |
| 52 | 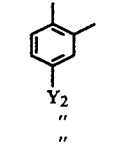 | " | copper | bluish-tinged red |
| 53 | " | " | cobalt | brown |
| 54 | " | " | chromium | violet |
| 55 | 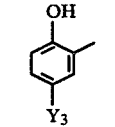 | " | copper | bluish-tinged red |

| Example | I Radical of the diazo component | II Radical of the coupling component | III Complex-forming metal | IV Color shade on cotton |
|---|---|---|---|---|
| 56 | " | " | cobalt | brown |
| 57 | " | " | chromium | violet |
| 58 | OH — CH₃ benzene — Y₄ | " | copper | bluish-tinged red |
| 59 | " | " | cobalt | brown |
| 60 | " | " | chromium | violet |
| 61 | OH — CH₃ naphthalene, Y₂ | " | copper | violet |
| 62 | OH — CH₃ naphthalene, Y₃ | " | copper | violet |
| 63 | OH — CH₃ naphthalene, Y₄ | " | copper | violet |
| 64 | OH — CH₃ naphthalene, Y₂ | " | copper | violet |
| 65 | OH — CH₃ naphthalene, Y₃ | " | copper | violet |
| 66 | OH — CH₃ naphthalene, Y₄ | " | copper | violet |
| 67 | Y₂—benzene—OH, CH₃ | " | copper | claret |
| 68 | Y₃—benzene—OH, CH₃ | " | copper | claret |
| 69 | Y₄—benzene—OH, CH₃ | " | copper | claret |
| 70 | OH — CH₃ benzene — Y₁ | OH, CH₃, HO₃S-naphthalene-NH—CO—(CH₂)₂—COOH | copper | red-violet |
| 71 | " | " | cobalt | brown |
| 72 | " | " | chromium | greyish-tinged violet |

TABLE-continued

| Example | I<br>Radical of the diazo component | II<br>Radical of the coupling component | III<br>Complex-forming metal | IV<br>Color shade on cotton |
|---|---|---|---|---|
| 73 | 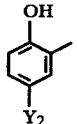 | " | copper | red-violet |
| 74 | 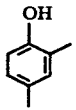 | " | copper | red-violet |
| 75 | 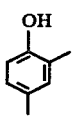 | " | copper | red-violet |
| 76 | 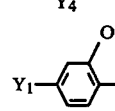 | " | copper | reddish-tinged violet |
| 77 | 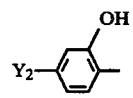 | " | copper | reddish-tinged violet |
| 78 | 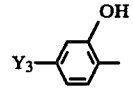 | " | copper | reddish-tinged violet |
| 79 | 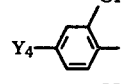 | " | copper | reddish-tinged violet |
| 80 | 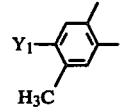 | " | copper | violet |
| 81 | 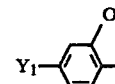 | " | copper | reddish-tinged blue |
| 82 | 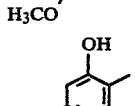 | " | copper | red-violet |
| 83 | 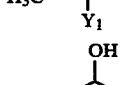 | " | copper | red-violet |
| 84 | 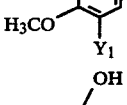 | " | copper | violet |
| 85 | 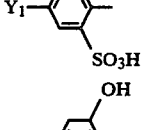 | " | copper | violet |

TABLE-continued

| Example | I Radical of the diazo component | II Radical of the coupling component | III Complex-forming metal | IV Color shade on cotton |
|---|---|---|---|---|
| 86 | HO₃S–[phenyl with OH, CH₃, Y₁] | " | copper | red-violet |
| 87 | " | " | cobalt | brown |
| 88 | " | " | chromium | grey-violet |
| 89 | Cl–[phenyl with OH, CH₃, Y₁] | " | copper | red-violet |
| 90 | O₂N–[phenyl with OH, CH₃, Y₁] | " | copper | red-violet |
| 91 | [naphthyl with OH, CH₃, Y₁] | " | copper | reddish-tinged blue |
| 92 | [naphthyl with OH, CH₃, Y₁] | " | copper | reddish-tinged blue |
| 93 | [naphthyl with Y₁, OH, CH₃] | " | copper | reddish-tinged blue |
| 94 | [naphthyl with Y₁, OH, CH₃, HO₃S] | " | copper | reddish-tinged blue |
| 95 | [naphthyl with OH, CH₃, Y₁] | " | copper | reddish-tinged blue |
| 96 | [naphthyl with OH, CH₃, Y₁] | " | copper | reddish-tinged blue |
| 97 | [naphthyl with OH, CH₃, Y₁] | " | copper | reddish-tinged blue |
| 98 | [phenyl with OH, CH₃, Y₁] | [naphthyl with OH, CH₃, NH–CO–(CH₂)₂–COOH, HO₃S, SO₃H] | copper | red-violet |
| 99 | " | " | cobalt | brown |
| 100 | " | " | chromium | greyish-tinged violet |
| 101 | Y₁–[phenyl with OH, CH₃] | " | copper | reddish-tinged violet |

TABLE-continued

| Example | I Radical of the diazo component | II Radical of the coupling component | III Complex-forming metal | IV Color shade on cotton |
|---|---|---|---|---|
| 102 | " | " | cobalt | brown |
| 103 | " | " | chromium | grey, violet-tinged |
| 104 | Y₁, OH on naphthalene with methyl | " | copper | reddish-tinged blue |
| 105 | Y₁, OH on naphthalene with methyl and HO₃S | " | copper | reddish-tinged blue |
| 106 | OH, methyl, Y₁ phenyl | OH, methyl, HO₃S, NH—CO—(CH₂)₂—COOH naphthalene | cobalt | brown |
| 107 | " | " | copper | red-violet |
| 108 | " | " | chromium | violet |
| 109 | Y₁-phenyl with OH, methyl | " | copper | reddish-tinged violet |
| 110 | " | " | cobalt | brown |
| 111 | " | " | chromium | grey, violet-tinged |
| 112 | Y₁, OH, methyl tetrahydronaphthalene | " | copper | reddish-tinged blue |
| 113 | Y₁, OH, methyl, HO₃S naphthalene | " | copper | reddish-tinged blue |
| 114 | OH, methyl, Y₁ phenyl | OH, methyl, SO₃H, HO₃S, MH—CO—(CH₂)₂—COOH naphthalene | copper | red-violet |
| 115 | " | " | cobalt | brown |
| 116 | " | " | chromium | greyish-tinged violet |
| 117 | Y₁, OH, methyl, HO₃S naphthalene | " | copper | reddish-tinged blue |
| 118 | OH, methyl, Y₁ phenyl | HO, NH—CO—(CH₂)₂—COOH, methyl, HO₃S, SO₃H naphthalene | copper | red-violet |
| 119 | " | " | cobalt | violet |
| 120 | " | " | chromium | navy-blue |
| 121 | OH, methyl, Y₂ phenyl | " | copper | red-violet |
| 122 | OH, methyl, Y₃ phenyl | " | copper | red-violet |

TABLE-continued

| Example | I Radical of the diazo component | II Radical of the coupling component | III Complex-forming metal | IV Color shade on cotton |
|---|---|---|---|---|
| 123 | OH / Y₄ (2-methylphenol, Y₄ para) | " | copper | red-violet |
| 124 | OH / Y₁ , CH₃ | " | copper | violet |
| 125 | " | " | cobalt | bluish-tinged violet |
| 126 | " | " | chromium | navy-blue |
| 127 | OH / Y₂ , CH₃ | " | copper | violet |
| 128 | OH / Y₃ , CH₃ | " | copper | violet |
| 129 | OH / Y₄ , CH₃ | " | copper | violet |
| 130 | OH / Y₁ , H₃C | " | copper | violet |
| 131 | OH / Y₁ , H₃CO | " | copper | reddish-tinged blue |
| 132 | OH / H₃C, Y₁ | " | copper | red-violet |
| 133 | OH / H₃CO, Y₁ | " | copper | violet, reddish-tinged |
| 134 | OH / Y₁ , SO₃H | " | copper | violet |
| 135 | OH / Y₁ , Cl | " | copper | violet |
| 136 | OH / Y₁ , Br | " | copper | violet |
| 137 | OH / HO₃S, Y₁ | " | copper | red-violet |
| 138 | " | " | cobalt | violet |
| 139 | " | " | chromium | navy-blue |

TABLE-continued

| Example | I Radical of the diazo component | II Radical of the coupling component | III Complex-forming metal | IV Color shade on cotton |
|---|---|---|---|---|
| 140 | 2-Cl, 6-Me, 4-$Y_1$ phenol (OH) | " | chromium | red-violet |
| 141 | 2-Br, 6-Me, 4-$Y_1$ phenol (OH) | " | chromium | red-violet |
| 142 | 2-$NO_2$, 6-Me, 4-$Y_1$ phenol (OH) | " | chromium | red-violet |
| 143 | 2-Me, 5-$Y_1$ naphthol (1-OH) | " | copper | blue |
| 144 | 2-Me, 6-$Y_1$ naphthol (1-OH) | " | copper | blue |
| 145 | 2-Me, 8-$Y_1$ naphthol (1-OH) | " | copper | blue |
| 146 | 2-Me, 8-$Y_1$, 6-$SO_3H$ naphthol (1-OH) | " | copper | blue |
| 147 | 1-Me, 5-$Y_1$ naphthol (2-OH) | " | copper | blue |
| 148 | 1-Me, 6-$Y_1$ naphthol (2-OH) | " | copper | blue |
| 149 | 1-Me, 6-$Y_1$ naphthol (2-OH) | " | copper | blue |
| 150 | 2-Me, 8-$Y_2$, 6-$SO_3H$ naphthol (1-OH) | " | copper | blue |
| 151 | 2-Me, 8-$Y_3$, 6-$SO_3H$ naphthol (1-OH) | " | copper | blue |

TABLE-continued

| Example | I Radical of the diazo component | II Radical of the coupling component | III Complex-forming metal | IV Color shade on cotton |
|---|---|---|---|---|
| 152 | OH, CH₃, Y₁ (phenol) | HO, NH—CO—(CH₂)₂—COOH on naphthalene with HO₃S, SO₃H, CH₃ | copper | red-violet |
| 153 | " | " | cobalt | violet |
| 154 | " | " | chromium | navy-blue |
| 155 | OH, CH₃, Y₁ (phenol) | " | copper | violet |
| 156 | " | " | cobalt | violet |
| 157 | " | " | chromium | navy-blue |
| 158 | OH, Y₁, H₃CO (substituted phenol) | " | copper | reddish-tinged blue |
| 159 | Y₁, OH, CH₃ (naphthalene) | " | copper | blue |
| 160 | Y₁, OH, CH₃, HO₃S (naphthalene) | " | copper | blue |
| 161 | OH, CH₃, Y₁ (phenol) | OH, CH₃, HO₃S, N(CH₃)—CO—(CH₂)₂—COOH on naphthalene | copper | bluish-tinged red |
| 162 | " | " | cobalt | brown |
| 163 | " | " | chromium | brown-violet |
| 164 | HO, CH₃, Y₁ (phenol) | HO, CH₃, HO₃S, N(CH₃)—CO—(CH₂)₂—COOH on naphthalene | copper | claret |
| 165 | " | " | cobalt | brown-violet |
| 166 | " | " | chromium | reddish-tinged navy-blue |
| 167 | Y₁, OH, CH₃, HO₃S (naphthalene) | " | copper | violet |
| 168 | OH, CH₃, Y₁ (phenol) | OH, CH₃, HO₃S, N(CH₃)—CO—(CH₂)₂—COOH on naphthalene | copper | red-violet |
| 169 | " | " | cobalt | brown |
| 170 | " | " | chromium | violet |
| 171 | OH, Y₁, CH₃ (phenol) | " | copper | reddish-tinged violet |
| 172 | OH, CH₃, Y₁ (phenol) | HO, CH₃, HO₃S, SO₃H, N(CH₃)—CO—(CH₂)₂—COOH on naphthalene | copper | red-violet |
| 173 | " | " | cobalt | violet |
| 174 | " | " | chromium | navy-blue |
| 175 | OH, CH₃, Y₁ (phenol) | " | copper | violet |
| 176 | " | " | cobalt | bluish-tinged |

TABLE-continued

| Example | I Radical of the diazo component | II Radical of the coupling component | III Complex-forming metal | IV Color shade on cotton |
|---|---|---|---|---|
| 177 | " | " | chromium | violet navy-blue |
| 178 | ![structure: naphthalene with $Y_1$, OH, methyl, $HO_3S$] | " | copper | blue |
| 179 | ![structure: naphthalene with OH, methyl, $Y_1$] | " | copper | blue |
| 180 | ![structure: phenol with OH, methyl, $Y_1$] | ![structure: naphthalene with OH, methyl, $HO_3S$, $SO_3H$, $N(C_2H_5)-CO-(CH_2)_2-COOH$] | copper | red-violet |
| 181 | ![structure: phenol with OH, methyl, $Y_1$] | " | cobalt | violet |
| 182 | " | " | chromium | navy-blue |
| 183 | ![structure: $Y_1$—phenol—OH, methyl] | " | copper | violet |
| 184 | ![structure: naphthalene with $Y_1$, OH, methyl, $HO_3S$] | " | copper | blue |
| 185 | ![structure: phenol OH, methyl, $Y_1$] | ![structure: naphthalene OH, methyl, $HO_3S$, $NH-CO-(CH_2)_2-COOH$] | copper | bluish-tinged red |
| 186 | " | ![structure: naphthalene OH, methyl, $HO_3S$, $NH-CO-(CH_2)_3-COOH$] | copper | bluish-tinged red |
| 187 | " | " | cobalt | brown |
| 188 | " | " | chromium | violet |
| 189 | ![structure: $Y_1$—phenol—OH, methyl] | " | copper | claret |
| 190 | " | " | cobalt | violet-brown |
| 191 | " | " | chromium | reddish-tinged navy-blue |
| 192 | ![structure: phenol OH, methyl, $Y_2$] | " | copper | bluish-tinged red |
| 193 | ![structure: phenol OH, methyl, $Y_3$] | " | copper | bluish-tinged red |
| 194 | ![structure: phenol OH, methyl, $Y_4$] | " | copper | bluish-tinged red |

TABLE-continued

| Example | I Radical of the diazo component | II Radical of the coupling component | III Complex-forming metal | IV Color shade on cotton |
|---|---|---|---|---|
| 195 | 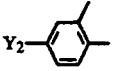 | " | copper | claret |
| 196 | 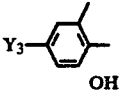 | " | copper | claret |
| 197 | 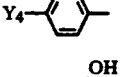 | 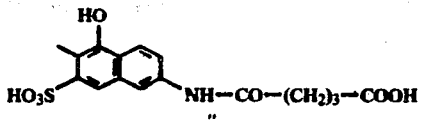 | copper | claret |
| 198 | 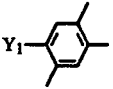 | " | copper | red-violet |
| 199 | " | " | cobalt | violet |
| 200 | " | " | chromium | navy-blue |
| 201 |  | 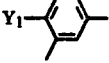 | copper | violet |
| 202 | " | " | cobalt | navy-blue |
| 203 | " | " | chromium | navy-blue |
| 204 | 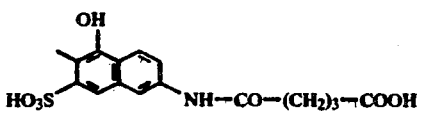 | " | copper | bluish-tinged red |
| 205 | 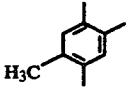 | " | copper | red-violet |
| 206 |  | " | copper | red-violet |
| 207 | 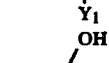 | " | copper | red-violet |
| 208 | 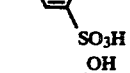 | " | copper | red-violet |
| 209 | 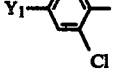 | " | copper | bluish-tinged red |
| 210 | " | " | cobalt | brown |
| 211 | " | " | chromium | brown-violet |
| 212 | 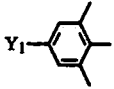 | 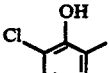 | copper | bluish-tinged red |
| 213 | " | " | cobalt | brown |
| 214 | " | " | chromium | violet |

| Example | I Radical of the diazo component | II Radical of the coupling component | III Complex-forming metal | IV Color shade on cotton |
|---|---|---|---|---|
| 215 | Br, OH, CH₃, Y₁ (bromo-methylphenol with Y₁) | " | copper | bluish-tinged red |
| 216 | O₂N, OH, CH₃, Y₁ (nitro-methylphenol with Y₁) | " | copper | red-violet |
| 217 | " | " | cobalt | brown-violet |
| 218 | " | " | chromium | navy-blue |
| 219 | OH, CH₃, Y₁ on naphthalene | " | copper | violet |
| 220 | OH, CH₃, Y₁ on naphthalene (isomer) | " | copper | violet |
| 221 | " | " | cobalt | navy-blue |
| 222 | " | " | chromium | navy-blue |
| 223 | Y₁, OH, CH₃ on naphthalene | " | copper | violet |
| 224 | Y₁, OH, CH₃, HO₃S on naphthalene | " | copper | violet |
| 225 | OH, CH₃, Y₁ on naphthalene | " | copper | violet |
| 226 | OH, CH₃, Y₁ on naphthalene | " | copper | violet |
| 227 | OH, CH₃, Y₁ on naphthalene | " | copper | violet |
| 228 | Y₂, OH, CH₃, HO₃S on naphthalene | OH, CH₃, HO₃S, NH—CO—(CH₂)₃—COOH on naphthalene | copper | violet |
| 229 | OH, CH₃, Y₁ on phenol | OH, CH₃, HO₃S, NH—CO—(CH₂)₃—COOH on naphthalene | copper | red-violet |
| 230 | " | " | cobalt | brown |
| 231 | " | " | chromium | violet |

TABLE-continued

| Example | I Radical of the diazo component | II Radical of the coupling component | III Complex-forming metal | IV Color shade on cotton |
|---|---|---|---|---|
| 232 | OH, CH₃, Y₂ (phenol) | " | copper | red-violet |
| 233 | OH, CH₃, Y₃ (phenol) | " | copper | red-violet |
| 234 | OH, CH₃, Y₄ (phenol) | " | copper | red-violet |
| 235 | OH, Y₁, CH₃ (phenol) | " | copper | red-violet |
| 236 | " | " | cobalt | violet-brown |
| 237 | " | " | chromium | navy-blue |
| 238 | OH, Y₂, CH₃ (phenol) | " | copper | red-violet |
| 239 | OH, Y₃, CH₃ (phenol) | " | copper | red-violet |
| 240 | OH, Y₄, CH₃ (phenol) | " | copper | red-violet |
| 241 | OH, Y₁, CH₃, H₃C (phenol) | " | copper | violet |
| 242 | OH, Y₁, CH₃, H₃CO (phenol) | " | copper | reddish-tinged blue |
| 243 | OH, H₃C, CH₃, Y₁ (phenol) | " | copper | red-violet |
| 244 | OH, H₃CO, CH₃, Y₁ (phenol) | " | copper | red-violet |
| 245 | OH, Y₁, CH₃, SO₃H (phenol) | " | copper | violet |
| 246 | OH, Y₁, CH₃, Cl (phenol) | " | copper | violet |

TABLE-continued

| Example | I Radical of the diazo component | II Radical of the coupling component | III Complex-forming metal | IV Color shade on cotton |
|---|---|---|---|---|
| 247 | HO₃S-, OH, CH₃, Y₁ (phenol with HO3S, OH, methyl, Y1 substituents) | " | copper | red-violet |
| 248 | " | " | cobalt | brown |
| 249 | " | " | chromium | violet |
| 250 | Cl, OH, CH₃, Y₁ substituted phenol | " | copper | red-violet |
| 251 | O₂N, OH, CH₃, Y₁ substituted phenol | " | copper | red-violet |
| 252 | OH, CH₃, Y₁ substituted naphthol | " | copper | reddish-tinged blue |
| 253 | OH, CH₃, Y₁ substituted naphthol | " | copper | reddish-tinged blue |
| 254 | Y₁, OH, CH₃ substituted naphthol | " | copper | reddish-tinged blue |
| 255 | Y₁, OH, CH₃, HO₃S substituted naphthol | " | copper | reddish-tinged blue |
| 256 | OH, CH₃, Y₁ substituted naphthol | " | copper | reddish-tinged blue |
| 257 | OH, CH₃, Y₁ phenol | OH, CH₃, HO₃S, SO₃H, NH—CO—(CH₂)₃—COOH substituted naphthol | copper | red-violet |
| 258 | " | " | cobalt | brown |
| 259 | " | " | chromium | violet |
| 260 | OH, Y₁, CH₃ substituted phenol | " | copper | reddish-tinged violet |
| 261 | Y₁, OH, CH₃, HO₃S substituted naphthol | " | copper | reddish-tinged blue |
| 262 | OH, CH₃, Y₁ phenol | HO, CH₃, HO₃S, NH—CO—(CH₂)₃—COOH substituted naphthol | copper | red-violet |
| 263 | " | " | cobalt | brown |
| 264 | " | " | chromium | violet |

TABLE-continued

| Example | I Radical of the diazo component | II Radical of the coupling component | III Complex-forming metal | IV Color shade on cotton |
|---|---|---|---|---|
| 265 | 4-$Y_1$-2-methylphenol (OH) | " | copper | reddish-tinged violet |
| 266 | 8-$Y_1$-6-$HO_3S$-2-methyl-1-naphthol | " | copper | reddish-tinged blue |
| 267 | 4-$Y_1$-2-methylphenol (OH) | 8-OH-7-methyl-6-$HO_3S$-3-$SO_3H$-4-NH—CO—$(CH_2)_3$—COOH-naphthalene | copper | red-violet |
| 268 | " | " | cobalt | brown |
| 269 | " | " | chromium | violet |
| 270 | 4-$Y_1$-2-methylphenol | " | copper | reddish-tinged violet |
| 271 | 8-$Y_1$-6-$HO_3S$-2-methyl-1-naphthol | " | copper | reddish-tinged blue |
| 272 | 4-$Y_1$-2-methylphenol | 1-HO-8-NH—CO—$(CH_2)_3$—COOH-2-methyl-3-$HO_3S$-6-$SO_3H$-naphthalene | copper | red-violet |
| 273 | " | " | cobalt | violet |
| 274 | " | " | chromium | navy-blue |
| 275 | 4-$Y_2$-2-methylphenol | 1-OH-8-NH—CO—$(CH_2)_3$—COOH-2-methyl-3-$HO_3S$-6-$SO_3H$-naphthalene | copper | red-violet |
| 276 | 4-$Y_3$-2-methylphenol | " | copper | red-violet |
| 277 | 4-$Y_4$-2-methylphenol | " | copper | red-violet |
| 278 | 4-$Y_1$-2-methylphenol | " | copper | violet |
| 279 | " | " | cobalt | bluish-tinged violet |
| 280 | " | " | chromium | navy-blue |
| 281 | 4-$Y_2$-2-methylphenol | " | copper | violet |
| 282 | 4-$Y_3$-2-methylphenol | " | copper | violet |
| 283 | 4-$Y_4$-2-methylphenol | " | copper | violet |

TABLE-continued

| Example | I Radical of the diazo component | II Radical of the coupling component | III Complex-forming metal | IV Color shade on cotton |
|---|---|---|---|---|
| 284 | $Y_1$—(phenyl with OH, $H_3C$, $H_3C$) | " | copper | violet |
| 285 | $Y_1$—(phenyl with OH, $H_3C$, $H_3CO$) | " | copper | reddish-tinged blue |
| 286 | (phenyl with OH, $H_3C$, $Y_1$) | " | copper | red-violet |
| 287 | (phenyl with OH, $H_3CO$, $Y_1$) | " | copper | reddish-tinged violet |
| 288 | $Y_1$—(phenyl with OH, $SO_3H$) | " | copper | violet |
| 289 | $Y_1$—(phenyl with OH, Cl) | " | copper | violet |
| 290 | $Y_1$—(phenyl with OH, Br) | " | copper | violet |
| 291 | (phenyl with $HO_3S$, OH, $Y_1$) | " | copper | red-violet |
| 292 | " | " | cobalt | violet |
| 293 | " | " | chromium | navy-blue |
| 294 | (phenyl with Cl, OH, $Y_1$) | " | copper | red-violet |
| 295 | (phenyl with Br, OH, $Y_1$) | " | copper | red-violet |
| 296 | (phenyl with $O_2N$, OH, $Y_1$) | " | copper | violet |
| 297 | (naphthyl with OH, $Y_1$) | " | copper | blue |

TABLE-continued

| Example | I Radical of the diazo component | II Radical of the coupling component | III Complex-forming metal | IV Color shade on cotton |
|---|---|---|---|---|
| 298 | [2-methyl-1-naphthol with Y₁ at 6-position, OH] | " | copper | blue |
| 299 | [2-methyl-1-naphthol with Y₁ at 8-position, OH] | " | copper | blue |
| 300 | [1-naphthol with Y₁ at 8-position, HO₃S at 6-position] | " | copper | blue |
| 301 | [naphthol with OH, methyl, Y₁] | " | copper | blue |
| 302 | [2-methyl-3-hydroxy naphthalene with Y₁] | " | copper | blue |
| 303 | " | " | cobalt | navy-blue |
| 304 | " | " | chromium | greenish-tinged navy-blue |
| 305 | [naphthol structure with OH, methyl, Y₁] | " | copper | blue |
| 306 | [Y₂, OH, methyl, HO₃S naphthalene] | HO NH—CO—(CH₂)₃—COOH, methyl, HO₃S, SO₃H naphthalene | copper | blue |
| 307 | [Y₃, OH, methyl, HO₃S naphthalene] | " | copper | blue |
| 308 | [OH, methyl, Y₁ benzene] | HO NH—CO—(CH₂)₃—COOH, methyl, HO₃S, SO₃H naphthalene | copper | red-violet |
| 309 | " | " | cobalt | violet |
| 310 | " | " | chromium | navy-blue |
| 311 | [OH, methyl, Y₁ benzene] | " | copper | violet |
| 312 | " | " | cobalt | violet |
| 313 | " | " | chromium | navy-blue |
| 314 | [Y₁, OH, methyl naphthalene] | " | copper | blue |
| 315 | [Y₁, OH, methyl, HO₃S naphthalene] | " | copper | blue |

TABLE-continued

| Example | I Radical of the diazo component | II Radical of the coupling component | III Complex-forming metal | IV Color shade on cotton |
|---|---|---|---|---|
| 316 | 3-methyl-6-Y₁-naphthalen-2-ol (OH at 1) | " | copper | blue |
| 317 | 2-methyl-4-Y₁-phenol | 1-HO, 2-CH₃, 3-HO₃S, 6-N(CH₃)CO(CH₂)₃COOH-naphthalene | copper | bluish-tinged red |
| 318 | " | " | cobalt | brown |
| 319 | " | " | chromium | brown-violet |
| 320 | 2-methyl-5-Y₁-phenol (OH) | " | copper | claret |
| 321 | 2-methyl-4-Y₁-phenol | 1-OH, 2-CH₃, 3-HO₃S, 7-N(CH₃)CO(CH₃)₂COOH-naphthalene | copper | red-violet |
| 322 | 2-methyl-5-Y₁-phenol | " | copper | reddish-tinged violet |
| 323 | 2-methyl-4-Y₁-phenol | 1-HO, 2-CH₃, 3-HO₃S, 8-N(CH₃)CO(CH₂)₃COOH-naphthalene | copper | red-violet |
| 324 | " | " | cobalt | violet |
| 325 | " | " | chromium | navy-blue |
| 326 | 2-methyl-5-Y₁-phenol | " | copper | violet |
| 327 | " | " | cobalt | bluish-tinged violet |
| 328 | " | " | chromium | navy-blue |
| 329 | 8-Y₁-1-OH-2-methyl-6-HO₃S-naphthalene | " | copper | blue |
| 330 | 2-methyl-4-Y₁-phenol | 1-OH, 2-CH₃, 3-HO₃S, 8-N(C₂H₅)CO(CH₂)₃COOH-naphthalene | copper | red-violet |
| 331 | " | " | cobalt | violet |
| 332 | " | " | chromium | navy-blue |
| 333 | 2-methyl-5-Y₁-phenol | " | copper | violet |
| 334 | 8-Y₁-1-OH-2-methyl-6-HO₃S-naphthalene | " | copper | blue |
| 335 | 2-methyl-4-Y₁-phenol | 1-OH, 2-CH₃, 3-HO₃S, 6-NHCO(CH₂)₄COOH-naphthalene | copper | bluish-tinged red |
| 336 | " | " | cobalt | brown |

| Example | I Radical of the diazo component | II Radical of the coupling component | III Complex-forming metal | IV Color shade on cotton |
|---|---|---|---|---|
| 337 | " | " | chromium | violet |
| 338 | Y₁—⌬(OH)(CH₃) | " | copper | claret |
| 339 | " | " | cobalt | violet-brown |
| 340 | " | " | chromium | reddish-tinged navy-blue |
| 341 | OH—⌬(CH₃)—Y₂ | " | copper | bluish-tinged red |
| 342 | OH—⌬(CH₃)—Y₃ | " | copper | bluish-tinged red |
| 343 | OH—⌬—Y₄ | " | copper | bluish-tinged red |
| 344 | Y₂—⌬(OH)(CH₃) | " | copper | claret |
| 345 | Y₃—⌬(OH)(CH₃) | " | copper | claret |
| 346 | Y₄—⌬(OH)(CH₃) | " | copper | claret |
| 347 | Y₁—⌬(OH)(CH₃)(H₃C) | " | copper | red-violet |
| 348 | Y₁—⌬(OH)(CH₃)(H₃CO) | " | copper | violet |
| 349 | OH—⌬(CH₃)(H₃C)—Y₁ | " | copper | bluish-tinged red |
| 350 | OH—⌬(CH₃)(H₃CO)—Y₁ | " | copper | red-violet |
| 351 | Y₁—⌬(OH)(CH₃)(SO₃H) | " | copper | red-violet |
| 352 | Y₁—⌬(OH)(CH₃)(Cl) | " | copper | red-violet |

TABLE-continued

| Example | I Radical of the diazo component | II Radical of the coupling component | III Complex-forming metal | IV Color shade on cotton |
|---|---|---|---|---|
| 353 | HO₃S, OH, CH₃, Y₁ (phenol with sulfo, methyl, Y₁) | " | copper | bluish-tinged red |
| 354 | " | " | cobalt | brown |
| 355 | " | " | chromium | brown-violet |
| 356 | Cl, OH, CH₃, Y₁ (chloro-methyl-phenol with Y₁) | " | copper | bluish-tinged red |
| 357 | Br, OH, CH₃, Y₁ | " | copper | bluish-tinged red |
| 358 | O₂N, OH, CH₃, Y₁ | " | copper | red-violet |
| 359 | " | " | cobalt | brown-violet |
| 360 | " | " | chromium | navy-blue |
| 361 | OH, CH₃, Y₁ (1-hydroxy-2-methyl-5-Y₁-naphthalene) | " | copper | violet |
| 362 | OH, CH₃, Y₁ (1-hydroxy-2-methyl-6-Y₁-naphthalene) | " | copper | violet |
| 363 | " | " | cobalt | navy-blue |
| 364 | " | " | chromium | navy-blue |
| 365 | Y₁, OH, CH₃ (1-hydroxy-2-methyl-8-Y₁-naphthalene) | " | copper | violet |
| 366 | Y₁, OH, CH₃, HO₃S (naphthalene substituted) | " | copper | violet |
| 367 | OH, CH₃, Y₁ (2-hydroxy-1-methyl-5-Y₁-naphthalene) | " | copper | violet |
| 368 | OH, CH₃, Y₁ (2-hydroxy-1-methyl-6-Y₁-naphthalene) | " | copper | violet |
| 369 | OH, CH₃, Y₁ (2-hydroxy-1-methyl-7-Y₁-naphthalene) | " | copper | violet |

| Example | I Radical of the diazo component | II Radical of the coupling component | III Complex-forming metal | IV Color shade on cotton |
|---|---|---|---|---|
| 370 | Y₂, OH, HO₃S, CH₃ (naphthalene with Y₂, OH, CH₃, HO₃S) | " | copper | violet |
| 371 | OH, CH₃, Y₁ (phenyl) | OH, CH₃, HO₃S, NH—CO—(CH₂)₄—COOH (naphthalene) | copper | red-violet |
| 372 | " | " | cobalt | brown |
| 373 | " | " | chromium | violet |
| 374 | OH, CH₃, Y₂ (phenyl) | " | copper | red-violet |
| 375 | OH, CH₃, Y₃ (phenyl) | " | copper | red-violet |
| 376 | OH, CH₃, Y₄ (phenyl) | " | copper | red-violet |
| 377 | Y₁—phenyl—OH, CH₃ | " | copper | red-violet |
| 378 | " | " | cobalt | violet-brown |
| 379 | " | " | chromium | navy-blue |
| 380 | Y₂—phenyl—OH, CH₃ | " | copper | red-violet |
| 381 | Y₃—phenyl—OH, CH₃ | " | copper | red-violet |
| 382 | Y₄—phenyl—OH, CH₃ | " | copper | red-violet |
| 383 | Y₁—phenyl—OH, CH₃, H₃C | " | copper | violet |
| 384 | Y₁—phenyl—OH, CH₃, H₃CO | " | copper | reddish-tinged blue |
| 385 | OH, CH₃, H₃C, Y₁ (phenyl) | " | copper | red-violet |
| 386 | OH, CH₃, H₃CO, Y₁ (phenyl) | " | copper | red-violet |

TABLE-continued

| Example | I Radical of the diazo component | II Radical of the coupling component | III Complex-forming metal | IV Color shade on cotton |
|---|---|---|---|---|
| 387 | 4-OH, 3-methyl, 5-SO₃H phenyl with Y₁ at 5-position (OH, CH₃, SO₃H substituted phenyl with Y₁) | " | copper | violet |
| 388 | 2-OH, 3-SO₃H, 6-methyl phenyl with Y₁ (HO₃S, OH, CH₃, Y₁ substituted phenyl) | " | copper | red-violet |
| 389 | " | " | cobalt | brown |
| 390 | " | " | chromium | violet |
| 391 | 2-Cl, 4-OH, 5-methyl phenyl with Y₁ | " | copper | red-violet |
| 392 | 2-O₂N, 4-OH, 5-methyl phenyl with Y₁ | " | copper | red-violet |
| 393 | 1-OH-2-methyl-5-Y₁-naphthyl | " | copper | reddish-tinged blue |
| 394 | 1-OH-2-methyl-6-Y₁-naphthyl | " | copper | reddish-tinged blue |
| 395 | 1-OH-2-methyl-6-SO₃H-8-Y₁-naphthyl | " | copper | reddish-tinged blue |
| 396 | 2-OH-1-methyl-6-Y₁-naphthyl | " | copper | reddish-tinged blue |
| 397 | 2-OH-3-methyl-5-Y₁-phenyl | 1-OH-2-methyl-3-SO₃H-6-(NH—CO—(CH₂)₄—COOH)-7-SO₃H-naphthyl | copper | red-violet |
| 398 | " | " | cobalt | brown |
| 399 | " | " | chromium | violet |
| 400 | 2-OH-3-methyl-5-Y₁-phenyl (isomer) | " | copper | reddish-tinged violet |
| 401 | 1-OH-2-methyl-6-SO₃H-8-Y₁-naphthyl | " | copper | reddish-tinged blue |
| 402 | 2-OH-3-methyl-5-Y₁-phenyl | 1-OH-2-methyl-3-SO₃H-5-(NH—CO—(CH₂)₄—COOH)-naphthyl | copper | red-violet |
| 403 | " | " | cobalt | brown |
| 404 | " | " | chromium | violet |

TABLE-continued

| Example | I<br>Radical of the diazo component | II<br>Radical of the coupling component | III<br>Complex-forming metal | IV<br>Color shade on cotton |
|---|---|---|---|---|
| 405 | OH, CH₃, Y₁ (phenol) | " | copper | reddish-tinged violet |
| 406 | Y₁, OH, CH₃, HO₃S-naphthalene | " | copper | reddish-tinged blue |
| 407 | OH, CH₃, Y₁ (phenol) | OH, CH₃, SO₃H, HO₃S, NH—CO—(CH₂)₄—COOH naphthalene | copper | red-violet |
| 408 | " | " | cobalt | brown |
| 409 | " | " | chromium | violet |
| 410 | OH, CH₃, Y₁ (phenol) | " | copper | reddish-tinged violet |
| 411 | Y₁, OH, CH₃, HO₃S-naphthalene | " | copper | reddish-tinged blue |
| 412 | OH, CH₃, Y₁ (phenol) | HO, NH—CO—(CH₂)₄—COOH, CH₃, HO₃S, SO₃H naphthalene | copper | red-violet |
| 413 | " | " | cobalt | violet |
| 414 | " | " | chromium | navy-blue |
| 415 | " | " | copper | red-violet |
| 415 | OH, CH₃, Y₂ (phenol) | " | copper | red-violet |
| 416 | OH, CH₃, Y₃ (phenol) | " | copper | red-violet |
| 417 | OH, CH₃, Y₄ (phenol) | " | copper | red-violet |
| 418 | OH, CH₃, Y₁ (phenol) | " | copper | violet |
| 419 | " | " | cobalt | bluish-tinged violet |
| 420 | " | " | chromium | navy-blue |
| 421 | OH, CH₃, Y₂ (phenol) | " | copper | violet |
| 422 | OH, CH₃, Y₃ (phenol) | " | copper | violet |
| 423 | OH, CH₃, Y₄ (phenol) | " | copper | violet |

TABLE-continued

| Example | I<br>Radical of the diazo component | II<br>Radical of the coupling component | III<br>Complex-forming metal | IV<br>Color shade on cotton |
|---|---|---|---|---|
| 424 | Y₁—(phenyl with OH, CH₃, H₃C) | " | copper | violet |
| 425 | Y₁—(phenyl with OH, CH₃, H₃CO) | " | copper | reddish-tinged blue |
| 426 | (phenyl with OH, CH₃, H₃C, Y₁) | " | copper | red-violet |
| 427 | (phenyl with OH, CH₃, H₃CO, Y₁) | " | copper | reddish-tinged violet |
| 428 | Y₁—(phenyl with OH, CH₃, SO₃H) | " | copper | violet |
| 429 | Y₁—(phenyl with OH, CH₃, Cl) | " | copper | violet |
| 430 | (phenyl with OH, CH₃, HO₃S, Y₁) | " | copper | red-violet |
| 431 | " | " | cobalt | violet |
| 432 | " | " | chromium | navy-blue |
| 433 | (phenyl with OH, CH₃, Cl, Y₁) | " | copper | red-violet |
| 434 | (phenyl with OH, CH₃, Br, Y₁) | " | copper | red-violet |
| 435 | (phenyl with OH, CH₃, O₂N, Y₁) | " | copper | violet |
| 436 | (naphthyl with OH, CH₃, Y₁) | " | copper | blue |
| 437 | (naphthyl with OH, CH₃, Y₁) | " | copper | blue |

TABLE-continued

| Example | I Radical of the diazo component | II Radical of the coupling component | III Complex-forming metal | IV Color shade on cotton |
|---|---|---|---|---|
| 438 | ![Y₁, OH, methyl naphthalene] | ![OH, NH—CO—(CH₂)₄—COOH, methyl, HO₃S, SO₃H naphthalene] | copper | blue |
| 439 | ![Y₁, OH, methyl, HO₃S naphthalene] | " | copper | blue |
| 440 | ![OH, methyl, Y₁ naphthalene] | " | copper | blue |
| 441 | ![OH, methyl, Y₁ naphthalene] | " | copper | blue |
| 442 | ![OH, methyl, Y₁ naphthalene] | " | copper | blue |
| 443 | " | " | cobalt | navy-blue |
| 444 | " | " | chromium | greenish-tinged navy-blue |
| 445 | ![Y₂, OH, methyl, HO₃S naphthalene] | " | copper | blue |
| 446 | ![Y₃, OH, methyl, HO₃S naphthalene] | " | copper | blue |
| 447 | ![OH, methyl, Y₁ benzene] | ![HO, NH—CO—(CH₂)₄—COOH, methyl, HO₃S, SO₃H naphthalene] | copper | red-violet |
| 448 | " | " | cobalt | violet |
| 449 | " | " | chromium | navy-blue |
| 450 | ![OH, methyl, Y₁ benzene] | " | copper | violet |
| 451 | " | " | cobalt | violet |
| 452 | " | " | chromium | navy-blue |
| 453 | ![Y₁, OH, methyl naphthalene] | " | copper | blue |
| 454 | ![Y₁, OH, methyl, HO₃S naphthalene] | " | copper | blue |

TABLE-continued

| Example | I Radical of the diazo component | II Radical of the coupling component | III Complex-forming metal | IV Color shade on cotton |
|---|---|---|---|---|
| 455 | 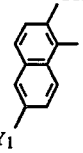 | 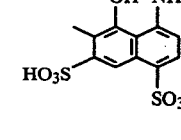 | copper | blue |
| 456 | 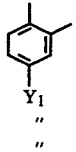 | 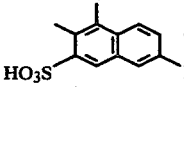 | copper | bluish-tinged red |
| 457 | " | " | cobalt | brown |
| 458 | " | " | chromium | brown-violet |
| 459 | 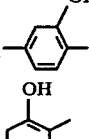 | " | copper | claret |
| 460 | 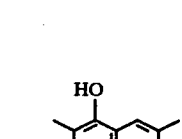 | 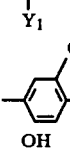 | copper | red-violet |
| 461 | 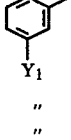 | " | copper | reddish-tinged violet |
| 462 | 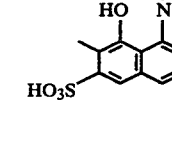 | 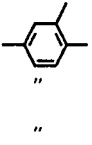 | copper | red-violet |
| 463 | " | " | cobalt | violet |
| 464 | " | " | chromium | navy-blue |
| 465 | 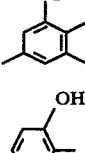 | " | copper | violet |
| 466 | " | " | cobalt | bluish-tinged violet |
| 467 | " | " | chromium | navy-blue |
| 468 | 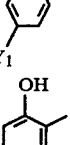 | " | copper | blue |
| 469 | 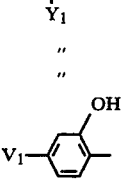 | " | copper | blue |
| 470 | 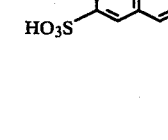 | | copper | red-violet |
| 471 | " | " | cobalt | violet |
| 472 | " | " | chromium | navy-blue |
| 473 | | " | copper | violet |

TABLE-continued

| Example | I<br>Radical of the diazo component | II<br>Radical of the coupling component | III<br>Complex-forming metal | IV<br>Color shade on cotton |
|---|---|---|---|---|
| 474 | Y₁ OH<br>HO₃S | " | copper | blue |

In this Table the symbols have the following meaning:
Y₁: —SO₂—CH₂—CH₂—OSO₃H
Y₂: —SO₂—CH═CH₂
Y₃: —SO₂—CH₂—CH₂—SSO₃H
Y₄: —SO₂—CH₂—CH₂—Cl

What is claimed is:

1. A copper, cobalt or chromium complex compound of a monoazo compound which, described in the form of the free acid, has the formula (1)

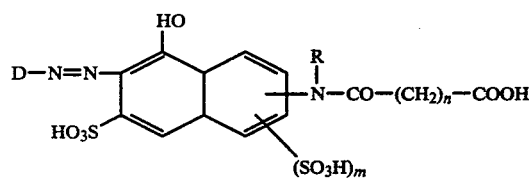

and a salt thereof, in which R is hydrogen or lower alkyl, m is zero or 1, n is 2, 3 or 4 and D is a radical of the formula, described in the form of the free acid,

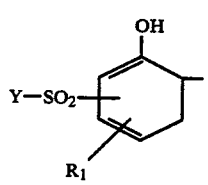

in which R₁ is hydrogen, lower alkyl, lower alkoxy, nitro sulfo, chlorine or bromine and Y is vinyl, β-sulfatoethyl, β-thiosulfatoethyl or β-chloroethyl.

2. A dyestuff according to claim 1, of the formula

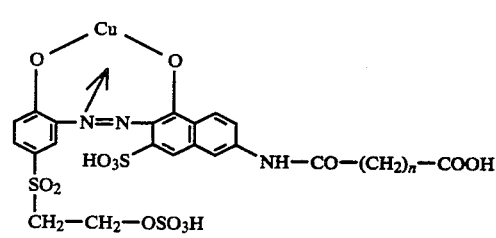

in which n is 2 or 3.

3. A dyestuff according to claim 1 of the formula

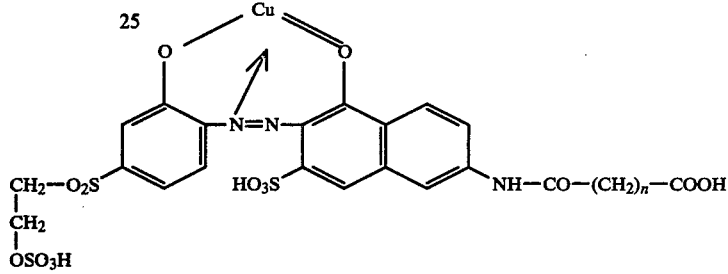

in which n is 2 or 3.

4. A dyestuff according to claim 1 of the formula

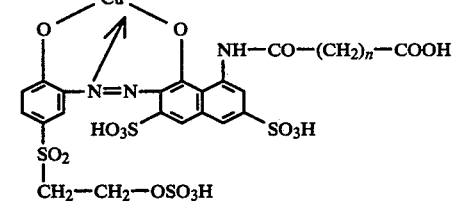

in which n is 2 or 3.

5. A dyestuff according to claim 1 of the formula

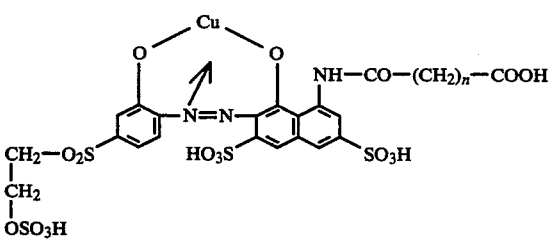

in which n is 2 or 3.

6. In a process for coloring a fiber material or leather, which comprises applying a dyestuff in an aqueous medium to a fiber material or to leather analogously to conventional dyeing and printing processes and fixing it on these by conventional fixing methods, preferably in the presence of an alkali-binding agent, the improvement consisting of using as a dyestuff a dyestuff of the formula (1) defined in claim 1.

* * * * *